March 7, 1961 K. L. STOVALL 2,973,977
PIPE COUPLING HAVING A PAIR OF CLAMPING
MEMBERS WITH SHARP TUBE BITING MEANS
Filed Oct. 22, 1957
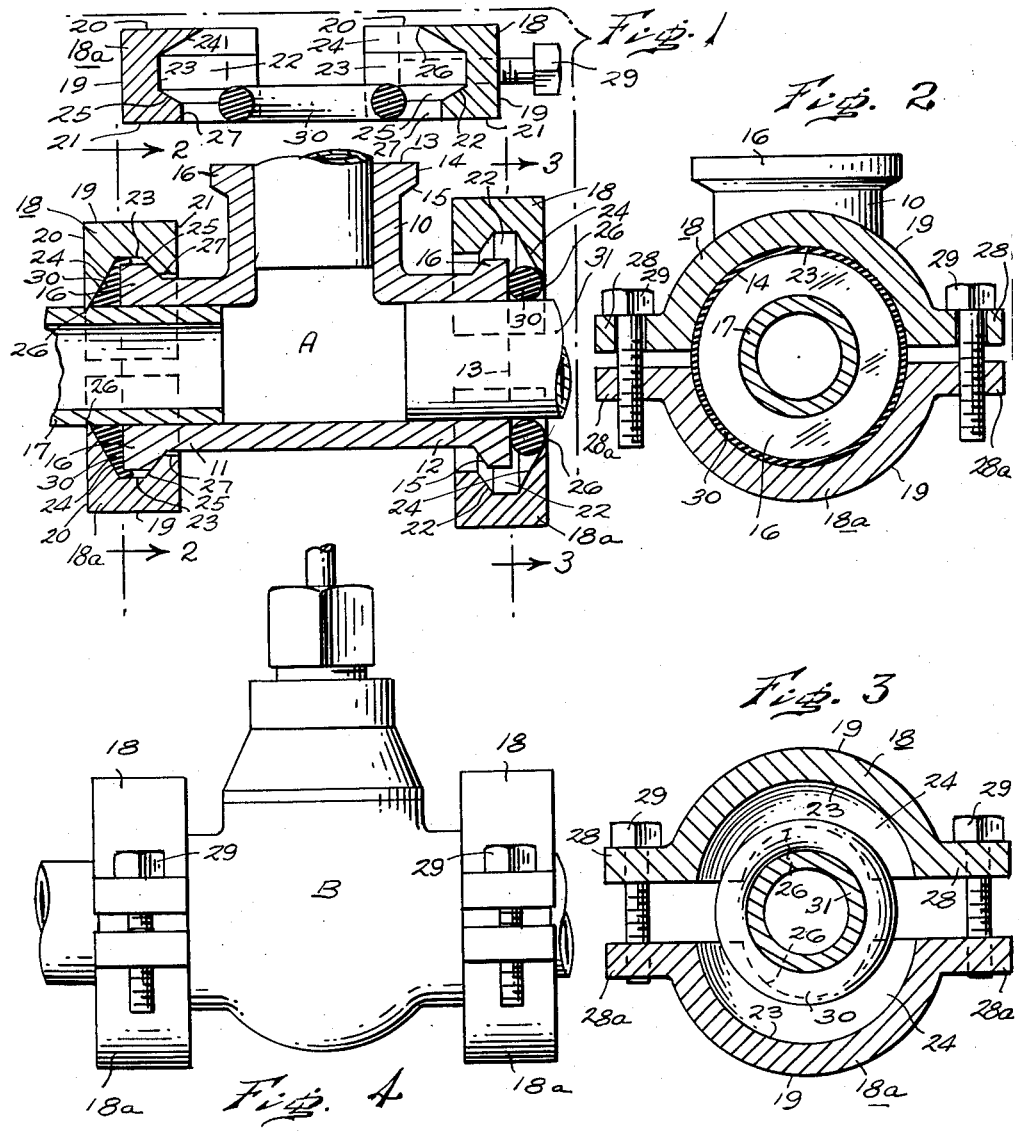
INVENTOR
KENNETH L. STOVALL
BY Leo Edelson
ATTORNEY

United States Patent Office 2,973,977
Patented Mar. 7, 1961

2,973,977

PIPE COUPLING HAVING A PAIR OF CLAMPING MEMBERS WITH SHARP TUBE BITING MEANS

Kenneth L. Stovall, 628 Pittock Block, Portland, Oreg.

Filed Oct. 22, 1957, Ser. No. 691,719

1 Claim. (Cl. 285—337)

This invention relates generally to pipe line fittings and more particularly to improvements in the means for effecting connections between such fittings and the pipe line.

A principal object of the present invention is to provide means for effecting a connection without the use of threads, whereby to increase the ability of the pipe line to withstand corrosion and the stresses and strains to which it may be subjected.

Another principal object of the present invention is to provide means for effecting a connection that materially facilitates the work of laying out the pipe line, by eliminating the necessity for utilizing conventional unions, and simplifies installation procedures.

Still another principal object of the present invention is to provide means for effecting a connection that withstands comparatively high pressures in the pipe line, while still allowing slight flexibility and some vibration.

Other objects and advantages of the present invention will appear more fully hereinafter, it being understood that the invention consists substantially in the combination, construction, location and relative arrangement of parts, all as described in the accompanying drawings and as finally pointed out in the appended claim.

In the accompanying drawings:

Figure 1 is a section through a pipe T constructed in accordance with and embodying the principles of the present invention, showing the three connections in different stages of assembly.

Figures 2 and 3 are sections respectively on lines 2—2 and 3—3 of Figure 1.

Figure 4 is an elevation of a valve constructed in accordance with and embodying the principles of the present invention.

Referring particularly to Figures 1, 2 and 3, the exemplary pipe fitting constructed in accordance with and embodying the principles of the present invention is a T-shaped member, generally designated A, that is provided with a stem 10 and a pair of oppositely extending branches 11 and 12, each of which is provided with a radially extending terminal surface 13, an axially extending cylindrical surface 14 and a circumferentially extending axially tapering surface 15 to thereby provide an external flange 16.

Referring to Figure 1, and particularly to the connection of the pipe line to the branch 11 of the fitting, the pipe line section, designated 17 is slidably fitted into the branch 11 and is projected into the same a substantial distance. For making the joint tight, a coupling that includes two essentially identical parts which conjointly embrace the flange 16 is utilized. Each of these coupling parts, designated 18 and 18a, is arcuate in form, being provided with an outer arcuate surface 19 and axially spaced parallel opposite side faces 20 and 21. The inner side of the coupling part is provided with an arcuately shaped channel 22 that is defined by an axially extending base wall area 23 and opposite side wall areas 24 and 25. The side wall area 24 is disposed adjacent the face 20 of the coupling and tapers axially to thereby conjointly form therewith a sharp arcuately shaped edge 26, while the side wall area 25 tapers axially in the opposite direction, there being an axially extending inner surface area 27 interposed between the channel 22 and the face 21 of the coupling.

The coupling 18 terminates at opposite ends respectively in a pair of oppositely extending ears 28—28, and the coupling part 18a terminates at opposite ends respectively in a pair of oppositely extending ears 28a—28a. For securing the coupling parts 18 and 18a together, a pair of studs 29—29 are provided, each of which extends freely through one of the ears 28 and is threaded into the associated ear 28a.

The external flange 16 that is formed on the branch 11 extends radially outwardly into the channels 22—22 respectively of the coupling parts 18 and 18a. With the studs 29—29 drawn up tight, the axially tapering surface area 15 of the flange 16 and the axially tapering surface areas 25—25 of the coupling parts mutually bear fully upon one another, and the sharp arcuately shaped edges 26—26 respectively of the coupling parts 18 and 18a bight into the outer surface of the pipe line section 17. Embracing the latter is a sealing ring 30, preferably made of neoprene, which fully occupies the annular space extending about the pipe line section 17, being squeezed tight between the axially tapering surfaces 24—24 respectively of the coupling parts 18 and 18a and the terminal surface 13 of the branch 11.

Referring to Figure 1, and particularly to the connection of the pipe line to the branch 12, to effect the tight connection described hereinabove, the sealing ring 30, initially circular in transverse section, is fitted over the end of the pipe line section, designated 31, and then the latter is projected into the branch 12. Now the coupling parts 18 and 18a are positioned on opposite sides of the joint, each in overlying relation to the flange 16 of the branch 12 and the sealing ring 30, with the axially tapering channel side walls 24—24 respectively of the coupling parts 18 and 18a engaging the sealing ring 30, and the channels 22—22 respectively of the coupling parts 18 and 18a in position for conjointly receiving the flange 16 of the branch 12. As the studs 29—29 are turned into the coupling part 18a, the coupling parts 18 and 18a are drawn together, and the channel side walls 25—25 come into contact with and move over the surface 15 of the flange 16, whereby the coupling parts 18 and 18a are cammed radially and axially inwardly to thereby deform the sealing ring 30 and squeeze the same against the terminal surface 13 of the branch 12, and to thereby fully occupy the annular space extending about the pipe line section 31, between the channel side walls 24—24 respectively of the coupling parts 18 and 18a and the terminal surface 13 of the branch 12. In addition, as the coupling parts 18 and 18a approach their final positions, the arcuately shaped sharp edges 26—26 thereof engage the outer surface of the pipe line section 31 and bite into the same. Preferably, the channel base walls 23—23 respectively of the coupling parts 18 and 18a and the inner surface areas 27—27 respectively of the coupling parts 18 and 18a never come into direct contact with the flange 16 of the branch 12.

The connection of the present invention eliminates undue reduction in the effective cross sectional area of the pipe, as by threading the same, in consequence of which the useful life of the pipe is materially prolonged and the mechanical strength thereof increased. In addition, layout, fabrication, erection and maintenance of a pipe line are materially simplified when the connection of the present invention is utilized. Furthermore, this connection can be utilized effectively in high pressure lines, and where a reasonable degree of flexibility is needed and/or where vibration is a problem.

It will be understood, of course, that the present invention is susceptible of various changes and modifications which may be made from time to time without departing from the real spirit or general principles thereof. For example, referring particularly to Figure 4, the present invention is shown applied to a globe valve B, instead of a pipe T. Accordingly, it is intended to claim the same broadly, as well as specifically, as indicated by the appended claim.

What is claimed as new and useful is:

In combination, a pipe fitting including a cylindrical extremity terminating in a radially outwardly extending protuberance having an axially tapered undersurface, a pipe section terminating in a portion slidably fitted into said cylindrical extremity, a sealing ring tightly embracing said pipe section and abutting said cylindrical extremity, and a coupling including a pair of coupling parts conjointly embracing said sealing ring and protuberance and provided respectively with a pair of arcuate channels formed upon the inner peripheries thereof and conjointly operative for receiving said protuberance and seal, and means for drawing said coupling parts together to thereby bring the opposite side channel walls thereof to bear radially inwardly respectively upon said axially tapered undersurface of the protuberance and the outer surface of said pipe section, said sealing ring being wedged thereby tightly between the channel side walls bearing upon said pipe section and said cylindrical extremity, the channel side walls upon the pipe section engaging side of the coupling being axially tapered to thereby provide radially inwardly extending sharp means bearing upon and biting into said pipe section.

References Cited in the file of this patent

UNITED STATES PATENTS

| | | |
|---|---|---|
| 324,154 | Pare | Aug. 11, 1885 |
| 364,947 | Moore | June 14, 1887 |
| 1,638,482 | French | Aug. 9, 1927 |
| 1,830,782 | Burnish | Nov. 10, 1931 |
| 1,994,361 | Johnson | Mar. 12, 1935 |
| 2,177,184 | Martin | Oct. 24, 1939 |
| 2,415,753 | Newell | Feb. 11, 1947 |

FOREIGN PATENTS

| | | |
|---|---|---|
| 453,587 | France | Apr. 8, 1913 |
| 167,749 | Switzerland | May 16, 1934 |
| 809,040 | France | Dec. 3, 1936 |